(12) United States Patent
Yano

(10) Patent No.: US 12,298,177 B2
(45) Date of Patent: May 13, 2025

(54) OPTICAL FIBER SENSING SYSTEM, MEASURING DEVICE, AND MEASURING METHOD

(71) Applicant: NEC Corporation, Tokyo (JP)

(72) Inventor: Yutaka Yano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 422 days.

(21) Appl. No.: 17/780,113

(22) PCT Filed: Sep. 7, 2020

(86) PCT No.: PCT/JP2020/033811
§ 371 (c)(1),
(2) Date: May 26, 2022

(87) PCT Pub. No.: WO2021/111691
PCT Pub. Date: Jun. 10, 2021

(65) Prior Publication Data
US 2022/0299358 A1    Sep. 22, 2022

(30) Foreign Application Priority Data

Dec. 3, 2019 (JP) ................................ 2019-218774

(51) Int. Cl.
*H04B 10/077* (2013.01)
*G01D 5/353* (2006.01)
(Continued)

(52) U.S. Cl.
CPC ......... *G01H 9/006* (2013.01); *G01D 5/35361* (2013.01); *H01S 3/302* (2013.01); *H04B 10/0771* (2013.01); *H04J 14/02* (2013.01)

(58) Field of Classification Search
CPC .......................... H01S 3/302; H04B 10/0771
See application file for complete search history.

(56) References Cited

U.S. PATENT DOCUMENTS

| | | | |
|---|---|---|---|
| 2004/0174913 A1* | 9/2004 | Leplingard | H01S 3/302 372/3 |
| 2012/0035854 A1 | 2/2012 | Kragh et al. | |

(Continued)

FOREIGN PATENT DOCUMENTS

| | | |
|---|---|---|
| JP | S59-148835 A | 8/1984 |
| JP | H04-264699 A | 9/1992 |

(Continued)

OTHER PUBLICATIONS

International Search Report for PCT Application No. PCT/JP2020/033811, mailed on Oct. 13, 2020.

(Continued)

*Primary Examiner* — Eric Wong
(74) *Attorney, Agent, or Firm* — Sughrue Mion, PLLC

(57) ABSTRACT

An optical fiber sensing system is acquired by adding an optical fiber sensing function to an optical communication cable system, and the optical fiber sensing is performed by an interrogator by sending probe light to an optical fiber, detecting backscattered light of the probe light, and performing sensing on environmental information around the optical fiber. A first sensing device installed at a remote place different from a terminal station of the optical communication cable system includes the interrogator, a power source unit configured to receive power via the optical communication cable system and supply power into the device, and a communication unit configured to communicate with a second sensing device. The interrogator generates sensing data at each point on the optical fiber by performing sensing on environmental information around the optical fiber being connected to the first sensing device.

17 Claims, 11 Drawing Sheets

(51) Int. Cl.
*G01H 9/00* (2006.01)
*H01S 3/30* (2006.01)
*H04J 14/02* (2006.01)

(56) References Cited

U.S. PATENT DOCUMENTS

| | | | |
|---|---|---|---|
| 2012/0155857 A1* | 6/2012 | Wang | H04B 10/0771 |
| | | | 398/16 |
| 2016/0259083 A1 | 9/2016 | Barfoot et al. | |
| 2017/0343389 A1 | 11/2017 | Parker et al. | |
| 2022/0399938 A1* | 12/2022 | Yano | G01D 5/35358 |

FOREIGN PATENT DOCUMENTS

| | | |
|---|---|---|
| JP | H08-307348 A | 11/1996 |
| JP | H09-210740 A | 8/1997 |
| JP | 2001-281348 A | 10/2001 |
| JP | 2004-347575 A | 12/2004 |
| JP | 2006-292566 A | 10/2006 |
| JP | 2010-237153 A | 10/2010 |
| JP | 2014-197788 A | 10/2014 |
| JP | 2016-201989 A | 12/2016 |
| JP | 2019-518968 A | 7/2019 |
| WO | 2019/014721 A1 | 1/2019 |

OTHER PUBLICATIONS

JP Office Action for JP Application No. 2021-562457, mailed on May 23, 2023 with English Translation.

* cited by examiner

OPTICAL FIBER SENSING SYSTEM, MEASURING DEVICE, AND MEASURING METHOD

This application is a National Stage Entry of PCT/JP2020/033811 filed on Sep. 7, 2020, which claims priority from Japanese Patent Application 2019-218774 filed on Dec. 3, 2019, the contents of all of which are incorporated herein by reference, in their entirety.

TECHNICAL FIELD

The present invention relates to an optical fiber sensing system, a measuring device, and a measuring method.

BACKGROUND ART

An optical fiber is widely used for communication. For example, a communication cable system for connecting lands across the sea is widely laid and used in the world of today as a means for achieving an international communication network. Further, an optical fiber is also used as a sensor. For example, sensing can be performed on a sound and a vibration at a remote place by modulating light being transmitted through an optical fiber by applying a sound wave to the optical fiber and applying a vibration, and detecting the reflected light or the transmitted light. In recent years, such a sensor system is generally called distributed acoustic sensing (DAS). In DAS, a measuring device referred to as an interrogator is used.

Light passing through an optical fiber attenuates due to mainly a transmission loss of the optical fiber. An optical amplification relay device is used for compensating for the attenuation. Even when a loss is compensated, there is a restriction on a distance in which an optical signal can be transmitted. That is a restriction such as deterioration of optical signal to noise ratio (SNR) due to accumulation of optical noise and deterioration due to a nonlinear optical effect in the optical fiber. In an optical communication system, for example, a transpacific circuit between Japan and America is also achieved by optical amplification relay by optimizing a circuit design.

Meanwhile, similarly to light of communication, optical fiber sensing is also subjected to a transmission loss, and thus an optical amplification relay device for compensating for the attenuation is effective. Even when a loss is compensated, there is also a restriction on a sensable distance similarly to communication. However, the sensable distance is generally shorter than a distance in which communication can be achieved. There are two conceivable reasons for this. One of the reasons is that DAS is to observe backscattered light, but is easily affected by noise since generated backscattered light is weak.

The other reason is caused by a principle of DAS that observes backscattered light, and is a restriction that next light cannot be sent until backscattered light is not returned after an interrogator sends light. When a sensing distance is increased, a sampling frequency needs to be decreased, and a required observation frequency band cannot be satisfied. For example, since a time for light to reciprocate through an optical fiber of 1000 km is approximately 0.01 second, a frequency at which an interrogator can send light is limited to less than 100 Hz. As a result, by a sampling theorem, when a phenomenon where a frequency is quicker than 50 Hz occurs in an optical fiber, a proper observation cannot be achieved. Contrivance such as sequential sending with different wavelengths is presented, but a cost increases. Even when a sensable distance is increased by using optical amplification relay, a restriction appears on the sampling frequency with an extremely long sensable distance, and a practical value is impaired.

CITATION LIST

Patent Literature

[Patent Literature 1] Japanese Unexamined Patent Application Publication No. S59-148835
[Patent Literature 2] Japanese Unexamined Patent Application Publication No. 2016-201989
[Patent Literature 3] Japanese Unexamined Patent Application Publication No. 2014-197788

SUMMARY OF INVENTION

Technical Problem

Depending on a position in which sensing is performed by DAS, an interrogator may be desired to be installed at a remote place in absence of a communication infrastructure and a power supply infrastructure being located away from a living area of human. However, a specific method of performing sensing by installing an interrogator at the remote place as described above is not disclosed. As a cable system for other use with a device being placed at such a remote place, there is a submarine optical communication cable system, for example, but a method of combining an interrogator within the system is also not disclosed so far.

In view of the circumstances, an object of the present development is to provide an optical fiber sensing system, a measuring device, and a measuring method that are able to perform remote sensing by installing an interrogator at a remote place in absence of a communication infrastructure and a power supply infrastructure.

Solution to Problem

An optical fiber sensing system according to one example embodiment is an optical fiber sensing system acquired by adding an optical fiber sensing function to a long-range optical communication cable system including an optical amplification relay device, and the optical fiber sensing system includes, the optical fiber sensing being performed by an interrogator by sending probe light to an optical fiber, detecting backscattered light of the probe light, and performing sensing on environmental information around the optical fiber:

a first sensing device installed at a remote place different from a terminal station of the optical communication cable system; and a second sensing device installed at the terminal station, and configured to communicate with the first sensing device, wherein the first sensing device includes the interrogator, a power source unit configured to receive power via the optical communication cable system and supply power into the first sensing device, and a communication unit configured to communicate with the second sensing device, the interrogator generates sensing data at each point on the optical fiber by performing sensing on environmental information around the optical fiber being connected to the first sensing device, and the communication unit transmits the sensing data to the second sensing device.

A measuring device according to one example embodiment is a measuring device for achieving an optical fiber sensing function being added to a long-range optical communication cable system including an optical amplification relay device, and the measuring device includes, the optical fiber sensing being performed by an interrogator by sending probe light to an optical fiber, detecting backscattered light of the probe light, and performing sensing on environmental information around the optical fiber:

a first sensing device installed at a remote place different from a terminal station of the optical communication cable system; and a second sensing device installed at the terminal station, and configured to communicate with the first sensing device, wherein the first sensing device includes the interrogator, a power source unit configured to receive power via the optical communication cable system and supply power into the first sensing device, and a communication unit configured to communicate with the second sensing device, the interrogator generates sensing data at each point on the optical fiber by performing sensing on environmental information around the optical fiber being connected to the first sensing device, and the communication unit transmits the sensing data to the second sensing device.

A measuring method according to one example embodiment is a measuring method in an optical fiber sensing system acquired by adding an optical fiber sensing function to a long-range optical communication cable system including an optical amplification relay device, and the measuring method includes, by a first sensing device installed at a remote place different from a terminal station of the optical communication cable system:

receiving power via the optical communication cable system and supplying power into the first sensing device;

generating sensing data at each point on an optical fiber being connected to the first sensing device by sending probe light to the optical fiber, detecting backscattered light of the probe light, and performing sensing on environmental information around the optical fiber, by an interrogator installed in the first sensing device; and transmitting the sensing data to a second sensing device installed at the terminal station.

Advantageous Effects of Invention

According to one example embodiment, an optical fiber sensing system, a measuring device, and a measuring method that are able to perform remote sensing by installing an interrogator at a remote place in absence of a communication infrastructure and a power supply infrastructure can be provided.

DESCRIPTION OF EMBODIMENTS

First Example Embodiment

Figure 1:
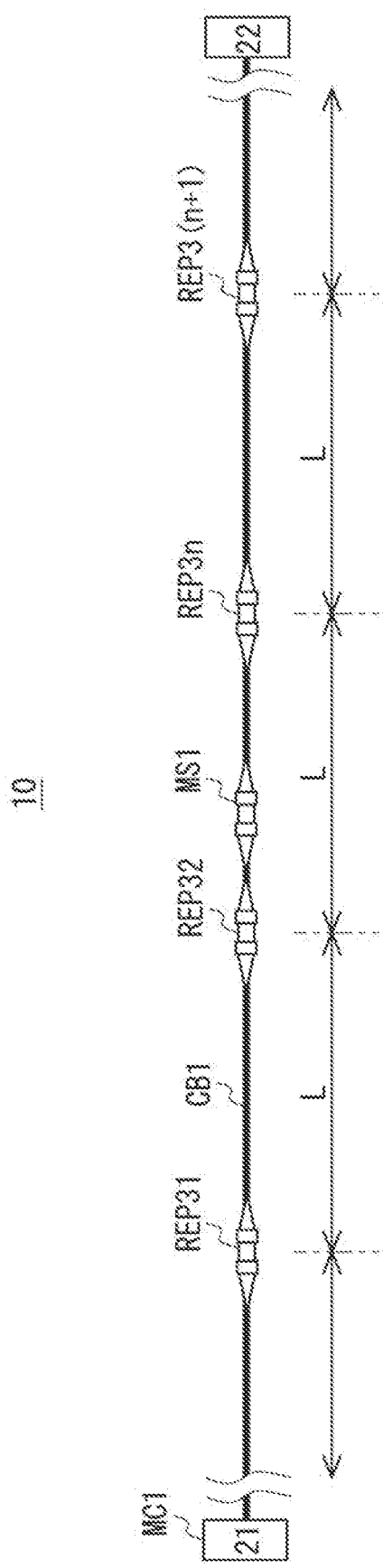
FIG. 1 is a configuration diagram illustrating a measuring system according to a first example embodiment.

A first configuration example of a measuring system according to a first example embodiment will be described. FIG. 1 is a configuration diagram illustrating a cable system 10 according to the first example embodiment. The cable system 10 is constituted of a communication system and a measuring system.

In this example, a portion of the communication system of the cable system 10 is described in a network configuration of point-to-point having the simplest configuration.

In this example embodiment, the measuring system is combined with a communication cable system, and a cable serving as a sensor is commonly used as a communication cable. As illustrated in FIG. 1, the communication system and the measuring system include terminal stations 21 and 22, the cable CB1, and an amplification relay device REP3n. In addition, the measuring system includes a measuring device MC1 and a measuring device MS1.

The measuring device MC1 placed at a terminal station and the measuring device MS1 placed remotely are configured to communicate with each other. In FIG. 1, the measuring device MC1 is placed at the terminal station 21.

The cable CB1 extends in one direction via a plurality of the relay devices REP3n, for example. For example, the plurality of relay devices REP 31 to REP3(n+1) are provided on the cable CB1 at an interval of a predetermined length L. The predetermined length is, for example, 60 km. FIG. 1 illustrates the cable CB1 linearly, but the cable CB1 may be curved or may be laid in a U-shape.

Figure 2:
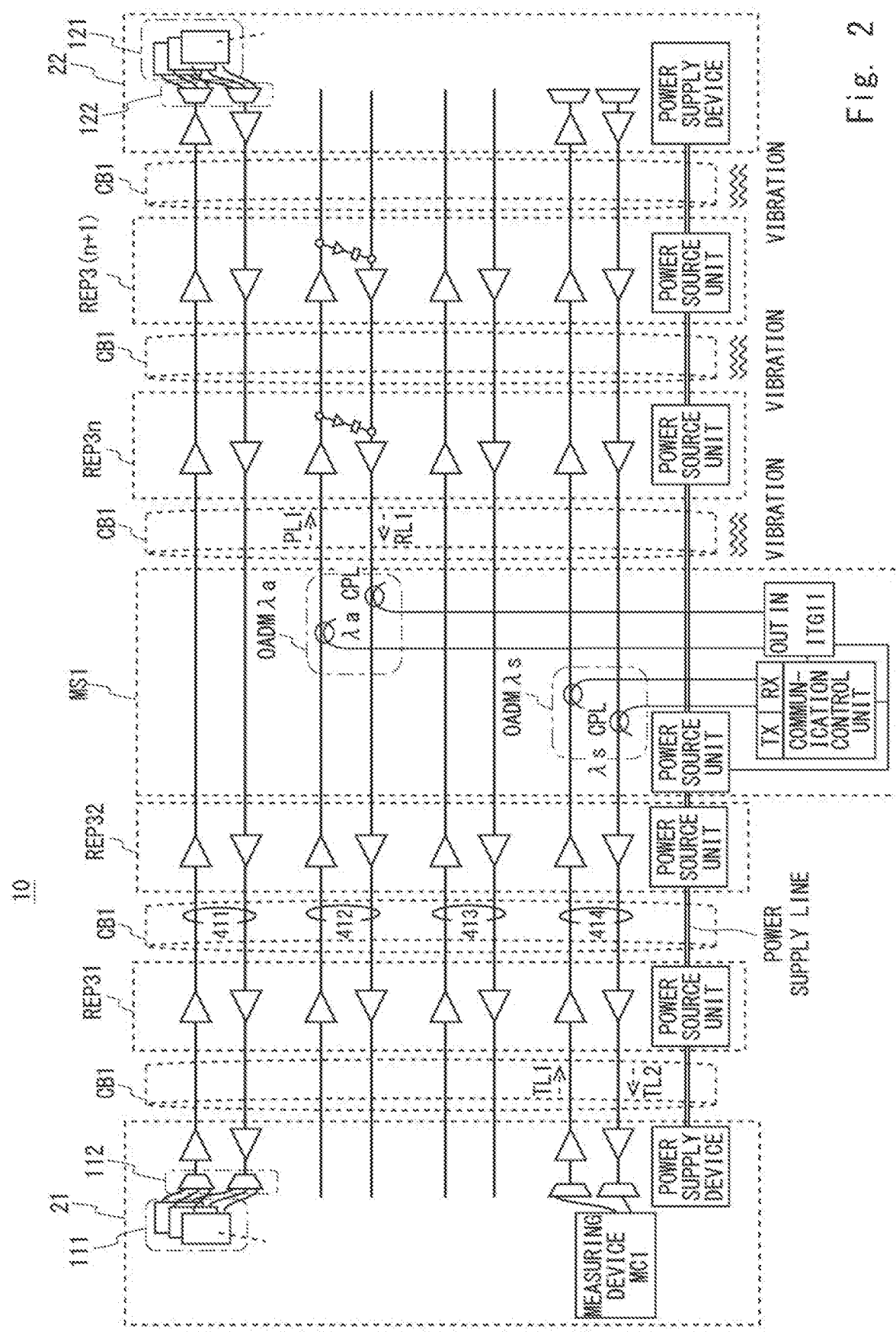
FIG. 2 is a configuration diagram illustrating a first configuration example of the measuring system according to the first example embodiment.
Figure 3:
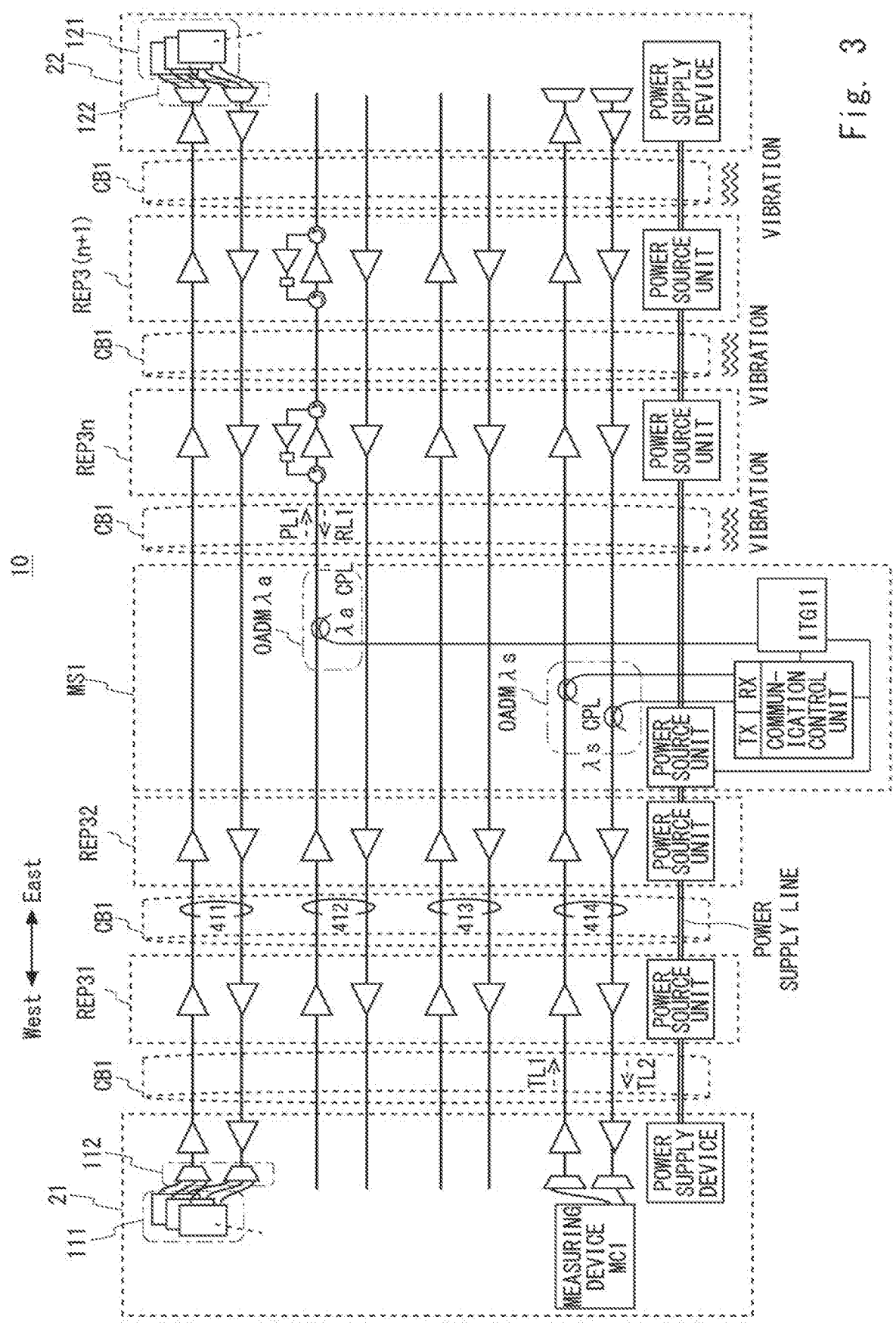
FIG. 3 is a configuration diagram illustrating the first configuration example of the measuring system according to the first example embodiment.

FIGS. 2 and 3 are a configuration diagram illustrating the cable system 10 according to the first example embodiment, and are a detailed diagram of FIG. 1. As illustrated in FIGS. 2 and 3, in the cable system 10, the cable CB1 includes a plurality of optical fiber core wire pairs 411 to 414 and a power supply line inside the cable CB1. Hereinafter, an optical fiber core wire pair is also referred to as a fiber pair (FP). In this example, all of the optical fiber core wire pairs are used for wavelength multiplexing communication between the terminal station 21 and the terminal station 22.

A terminal station device of the communication system includes, as a main component, a plurality of wavelength demultiplexers and a plurality of transponders, but FIGS. 2 and 3 only illustrate wavelength demultiplexers 112 and 122 and transponder groups 111 and 121 that are connected to the FP 411. A wavelength demultiplexer and a transponder group that are connected to the FPs 412 to 414 are omitted for avoiding complicatedness of drawings.

Figure 4:
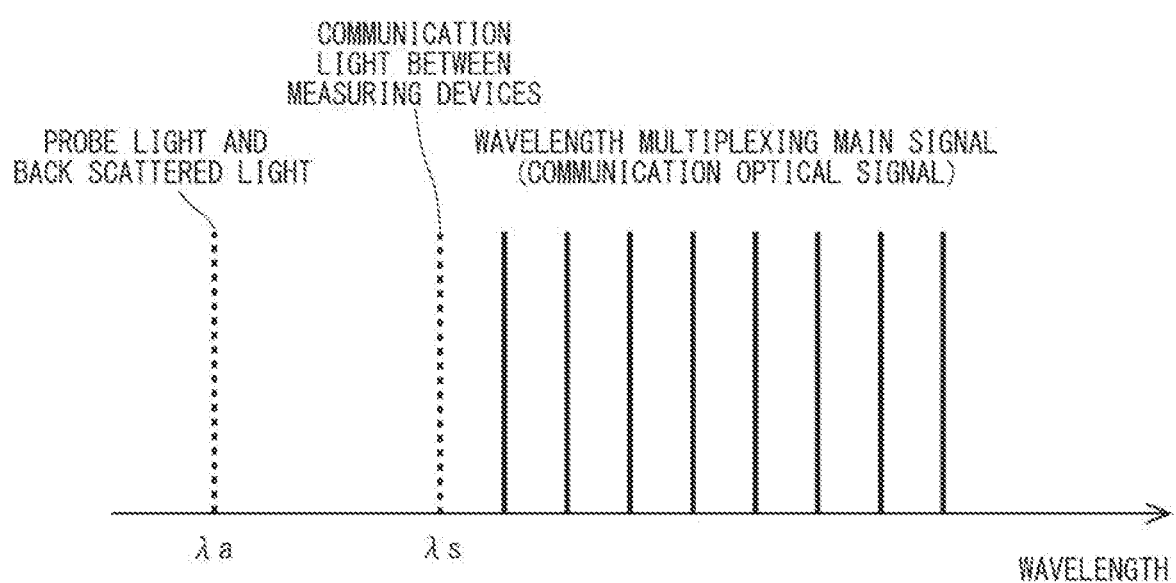
FIG. 4 is an explanatory diagram illustrating a wavelength arrangement.

A communication wavelength ($\lambda$s described later) between the measuring device MC1 and the measuring device MS1 and a wavelength ($\lambda$a described later) of sensing light are assigned in such a way that a wavelength is set different from a wavelength for communication. FIG. 4 is one example of such a wavelength arrangement. Note that, in the following description, sensing light is used as a term that collectively refers to both of probe light and backscattered light.

In FIGS. 2 and 3, communication between the measuring device MC1 and the measuring device MS1 is performed at the wavelength $\lambda$s through the FP 414. Further, in FIG. 2, sensing light is output at the wavelength $\lambda$a from the measuring device MS1 toward a direction of the terminal station 22 (direction indicated by an arrow PL1) through the FP 412, and is returned in a direction indicated by an arrow RL1.

In FIG. 3, sensing light is output at the wavelength $\lambda$a from the measuring device MS1 toward the direction of the terminal station 22 (direction indicated by the arrow PL1) through one optical fiber core wire of the FP 412, and is returned in the direction indicated by the arrow PL1.

Core wires tied in a bundle in the same cable CB1 substantially similarly receive an influence (for example, sound or temperature) of an environment in which the cable CB1 is placed, and thus performing sensing on any one of the core wires is generally sufficient. A drawing subsequent to FIG. 2 illustrates a scene where a cable capable of performing sensing on a surrounding environment by the present disclosed technique detects a vibration added to the cable, but performing sensing on a vibration is one example.

An additional part is needed for an optical amplifier of a fiber pair or an optical fiber core wire through which sensing light passes. An internal configuration thereof is not a content of the present disclosed technique, and will not be thus described in detail, but, in FIG. 2, a path in which backscattered light is amplified and multiplexed to an optical fiber core wire on a counter side is additionally provided to the optical amplifier. Further, the optical amplifier has a configuration of a single-core bidirectional amplifier.

In the cable system 10, the terminal station 21 and the terminal station 22 include a power supply device, and the cable CB1 includes the power supply line in order to send power to the relay device REP3n and the like. Each remote device includes a power source unit therein, and supplies, to an electric circuit and the like in the device, power received from the cable CB1. A similar power source unit is also provided in the measuring device MS1, and receives power from the cable CB1 and supplies power into the device.

In the examples in FIGS. 2 and 3, a fiber pair that performs communication between the measuring device MC1 and the measuring device MS1 and a fiber pair that performs sensing are different. Meanwhile, when a wavelength of light used for communication between the measuring device MC1 and the measuring device MS1 and a wavelength of sensing light are different from each other, it is needless to say that communication and sensing may be performed by using the same fiber pair.

In FIGS. 2 and 3, a core wire is commonly used for wavelength multiplexing communication and for sensing, but it is needless to say that a similar effect can be acquired even when a core wire is substantially used only for sensing without being used for wavelength multiplexing communication.

In FIGS. 2 and 3, fiber pairs are four pairs, but may be more or less than four pairs.

The measuring device MS1 includes an interrogator ITG11, a communication control unit, optical add drop multiplexing (OADM) $\lambda$a, OADM $\lambda$s, a power source unit, and the like. Further, through-connection is performed on an optical fiber core wire that is not involved. The through-connection performed on an optical fiber core wire indicates that the optical fiber core wire passes through a housing of the measuring device MS1, whereas a part in a device and the optical fiber core wire are not optically connected to each other. Therefore, an influence of the measuring device MS1 rarely needs to be considered in a circuit design of the communication system. In FIGS. 2 and 3, for example, the through-connection is performed on the FP 411 and the FP 413 with the measuring device MS1.

The interrogator ITG11 outputs probe light PL1 in the direction of the terminal station 22 of the FP 412 via the OADM $\lambda$a. The probe light PL1 is, for example, pulse light. Backscattered light RL1 is generated from the probe light PL1 output from the FP 412. The backscattered light RL1 is returned to the interrogator ITG11 via the OADM $\lambda$a. Thus, the interrogator ITG11 acquires, detects, and analyzes the backscattered light RL1 generated from the probe light PL1 in the optical fiber. By an analysis, sensing data indicating environmental information (such as vibration and temperature) at each point of an optical fiber cable in a sensing range are generated. In the examples illustrated in FIGS. 2 and 3, the interrogator ITG11 generates sensing data at each point on the FP 412 by performing sensing on environmental information around each point of the FP 412.

The communication control unit superimposes the generated sensing data on light at the wavelength $\lambda$s, and transmits the light to the measuring device MC1 located at the terminal station 21 through the FP 414.

The relay device REP3n provided on the cable CB1 by the predetermined length L amplifies and relays wavelength multiplexing communication light, the probe light PL1 being transmitted through the FP 412, the backscattered light RL1, inter-measuring device communication optical signals TL1 and TL2 being transmitted through the FP 414.

Figure 5:
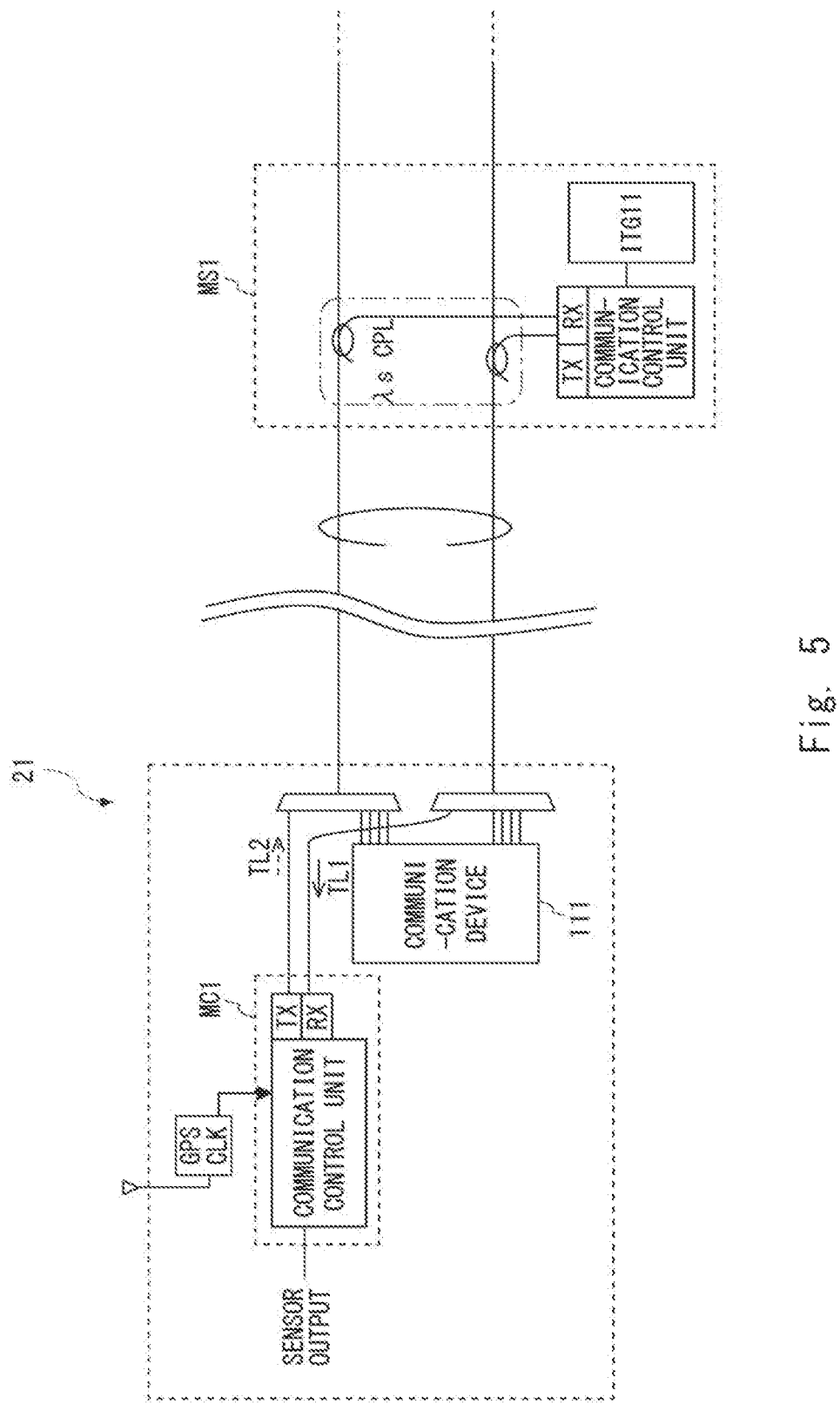
FIG. 5 is a configuration diagram illustrating a measuring device on a terminal station side in the first and second configuration examples of the measuring system according to the first example embodiment.

FIG. 5 is a configuration diagram illustrating the measuring device MC1 placed at the terminal station 21 in the measuring system according to the first example embodiment.

The measuring device MC1 includes at least an optical transmission/reception unit and a communication control unit, transmits a control command and the like to the measuring device MS1, and receives sensing data about a remote area from the measuring device MS1. The received sensing data are transmitted to a data center, for example, or recorded in a portable storage medium, for further analysis processing. A GPS CLK will be described later.

An effect of the configuration so far will be described.

As described in the background art, a sensable distance of optical fiber sensing is generally shorter than a communicable distance of a communication system. Thus, only a sensable range from an interrogator provided at a terminal station can be measured. However, when the technique provided by the present application is used, remote measurement can be achieved. In other words, by installing the interrogator ITG11 at a remote place, and performing sensing on a surrounding cable, acquired sensing data can be transmitted to the terminal station 21. In this way, sensing can also be performed across an entire length of the communication system.

In addition, the communication system and the measuring system have high independence from each other, and a design of the communication system is hardly affected even when the measuring system is added to or removed from the communication system. For example, with reference to FIG. 2, when the measuring device MS1 located remotely is assumed to be removed, it is understood that a design of the communication system is hardly affected. This is an effect that can be acquired because the measuring device MS1 has a configuration separately from the relay device. In addition, this is an effect that can be acquired because the inside of the measuring device MS1 has a transmission configuration equal to that in absence of a device other than a specific wavelength in a core wire accessed by the measuring device MS1 itself.

Similarly to the transponder group 111 in the wavelength multiplexing communication device, the measuring device MC1 installed at the terminal station 21 is designed in consideration of connection to and removal from the communication system.

A second configuration example acquired by adding contrivance of a time stamp to the first configuration example in the first example embodiment will be described.

In FIG. 5, the measuring device MC1 has a function of receiving time information from a time supply device in the terminal station 21, and transmitting the time information to the measuring device MS1 located remotely. As a typical example of the time supply device, the time supply device receives a GNSS satellite radio wave described later, and acquires a time. In the measuring device MS1, sensing data acquired by the interrogator ITG11 and time data are integrated, and thus information about how old the sensing data are can be provided. This is referred to as a time stamp.

Furthermore, not a little propagation delay is generated in optical fiber transmission between the measuring device MC1 and the measuring device MS1, and thus a correction of the propagation delay may be performed. A delay amount being actually generated is approximately one millisecond for optical fiber 200 km transmission.

A propagation delay amount can be determined by measuring a reciprocating time of a signal. For example, a signal is output from the measuring device MC1, and, when the measuring device MS1 receives the information, the measuring device MS1 immediately returns and transmits the information toward the measuring device MC1. The measuring device MC1 can confirm a time required for reciprocation from transmission to reception. When the measuring device MS1 previously recognizes a time required from reception to transmission, an optical fiber propagation delay amount can be more accurately determined by subtracting the time from a time required for reciprocation.

The reciprocating time measurement can be performed from the measuring device MS1 toward the measuring device MC1, or a propagation delay amount recognized by either one of the measuring devices can be transmitted to the other by communication.

In this way, the time information acquired by the measuring device MS1 indicates a slight delay from a true time and also an amount of the delay, and thus the delay can be corrected when a time stamp is added to data.

Addition of a time stamp to data can be performed by the measuring device MC1, but is desired to be performed on the measuring device MS1 side in which data are generated.

It is needless to say that, even when a time stamp is added on the measuring device MC1 side, a propagation delay correction is still needed.

Measurement of the propagation delay time may be simultaneously performed during continuous communication.

An effect of the second configuration example described above will be described. This configuration achieves an effect in execution by a submarine cable in particular. The reason is that the measuring device MS1 is located on a sea bottom, and thus a global navigation satellite system (GNSS) satellite radio wave cannot be reached, and time information cannot be acquired. The measuring device MC1 is located at a land terminal station and can acquire high-precision time information, and thus a means for transmitting a time through a communication path is desired.

Furthermore, for importance of a correction of a propagation delay time, it is important in processing of identifying a hypocenter of an earthquake, and the like, for example. In the processing, a hypocenter is calculated from a difference in arrival time of the same earthquake observed at a plurality of different places. When a time stamp is shifted even by a few milliseconds, it is understood that identification of a hypocenter is affected.

A third configuration example of the first example embodiment will be described.

A means for minimizing a processing function of the measuring device MS1 in function division of the measuring device MC1 and the measuring device MS1 is provided.

Figure 6A:
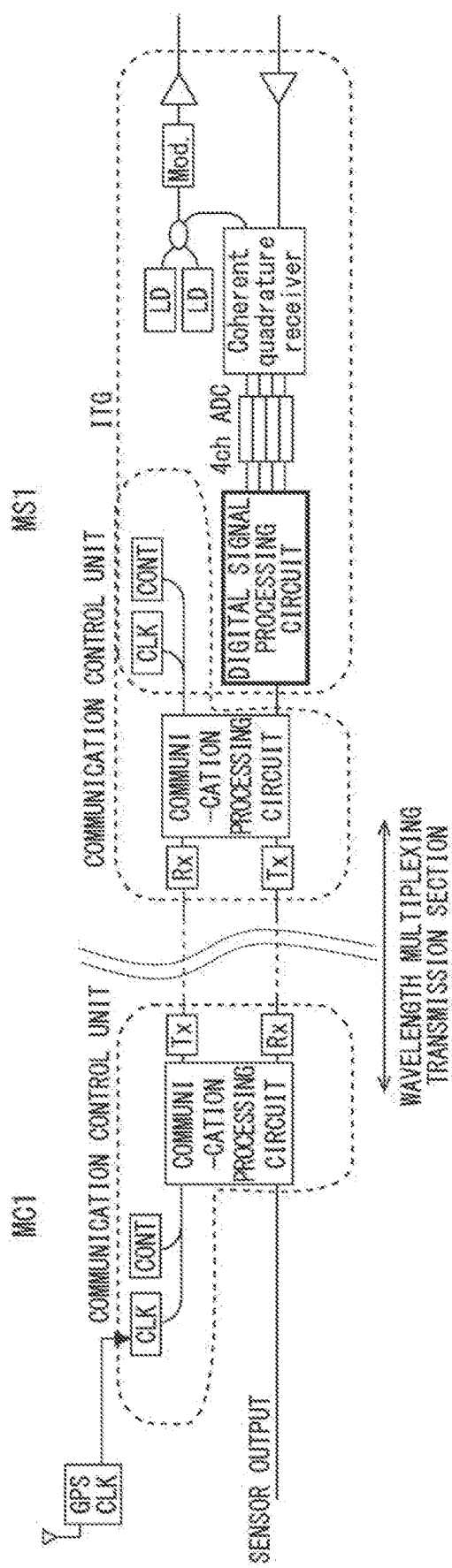
FIG. 6A is a configuration diagram illustrating a measuring system according to a comparative example.
Figure 6B:
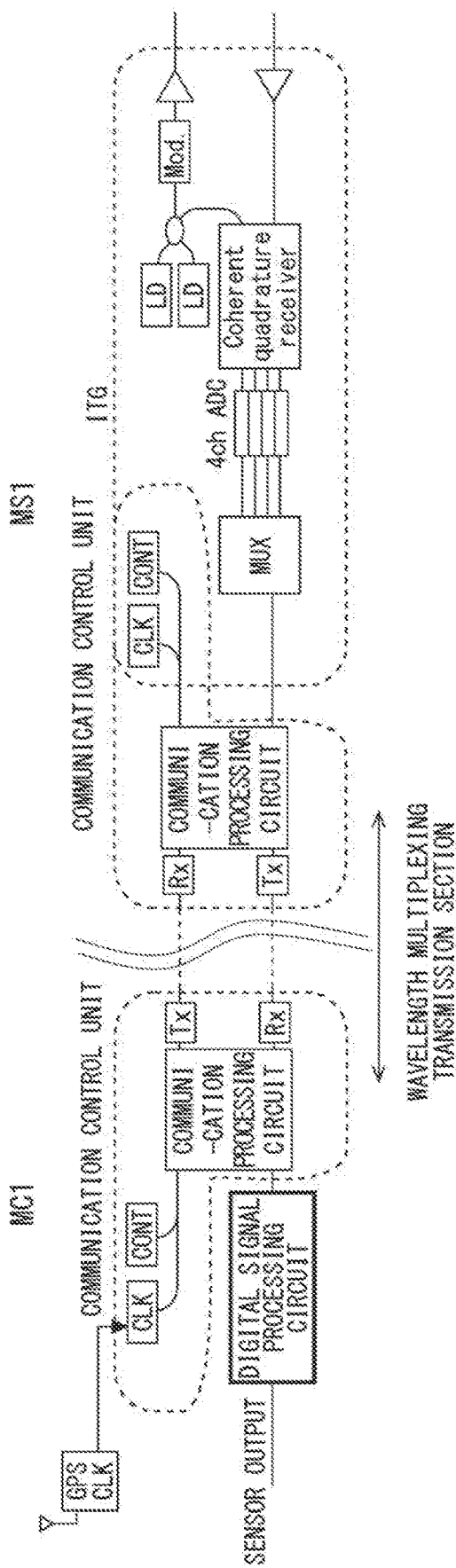
FIG. 6B is a configuration diagram illustrating a third configuration example of the measuring system according to the first example embodiment.

FIG. 6A is an explanatory diagram of a configuration according to a comparative example that does not use the present technique, and FIG. 6B is an explanatory diagram of a configuration to which the present technique is applied. A general interrogator illustrated in FIG. 6A sends probe light, receives backscattered light, performs AD conversion on an electric signal acquired from detection, and passes the electric signal to a digital signal processing circuit. A waveform of an electric signal acquired by detecting light is a raw reception signal representing intensity and a phase of reflected return light from moment to moment. The digital signal processing circuit processes a raw reception signal by a predetermined digital operation, and converts the raw reception signal into sensing data indicating environmental information (such as vibration and temperature) at each point of an optical fiber. The sensing data are transmitted as a signal of an optical communication system to the measuring device MC1 by the communication control unit. (In the measuring device MS1 in FIGS. 6A and 6B, a clock source (CLK) and a control unit (CONT) belong to both of the communication control unit and an interrogator ITG, but this is one example).

In contrast, in FIG. 6B, the digital signal processing circuit being moved to the measuring device MC1 side is a characteristic. In the measuring device MS1, the interrogator ITG performs processing of sending the probe light PL1, receiving the backscattered light RL1, and performing AD conversion on an electric signal acquired from detection, performs only processing of providing a time stamp to digital data before an analysis being acquired by performing the AD conversion, and processing (described as MUX) of performing frame multiplexing in such a way as to achieve communication, and transmits the digital data to the measuring device MC1. The digital signal processing circuit provided in the measuring device MC1 analyzes the data about the backscattered light RL1 being subjected to the AD conversion, converts the data into sensing data indicating environmental information (such as vibration and temperature) at each point of an optical fiber, and outputs the sensing data. As a result, the same output can be acquired in FIGS. 6A and 6B.

An electric signal in which light is just detected is not normally output to the outside of a device. The reason is that, once association with information about a measurement condition and a measurement target thereof is lost, a signal like insignificant noise, which cannot be restored to significant sensor output data, is acquired.

An effect of the third configuration example described above will be described. This configuration achieves an effect in execution by a submarine cable in particular. Since the measuring device MS1 is installed on a sea bottom, repair in an event of a failure is not easy, and thus high reliability is desired. In order to achieve this, it is important to reduce processing performed by the measuring device MS1 as much as possible, and reduce the number of parts. Further, since there is a restriction on power that can be sent via a submarine cable and there is also a problem of heat radiation from a device housing installed on a sea bottom, power consumption in the submarine device housing needs to be suppressed as much as possible. The reason is that a device installed on a sea bottom is formed in such a way as to resist high water pressure and also resist a high voltage, and heat generated inside is less likely to be radiated to the outside. The present disclosed technique is also effective for this. The reason is that power consumption of the digital signal processing circuit can be moved. These problems are reduced by the present disclosed technique.

An internal configuration of the interrogator ITG illustrated in FIG. 6B is one example. Herein, two light sources being parts having a relatively high failure rate are prepared and made redundant. Further, coherent detection is performed on one of outputs of the two light sources by reception light and a quadrature receiver and an interference output of each of an IQ phase and an XY polarized wave is acquired. In other words, four outputs of Ix, Iy, Qx, and Qy are acquired, and AD conversion is performed. This is converted into a form of a sensor output in each position on an optical fiber by digital signal processing, and is output. The configuration herein is one example, and all components and wiring other than those needed for the description of the present disclosed technique are not described. What the present technique discloses is a technique capable of performing digital signal processing after AD conversion on the MC1 side, and the effect described above can be acquired with only the technique.

Figure 7:
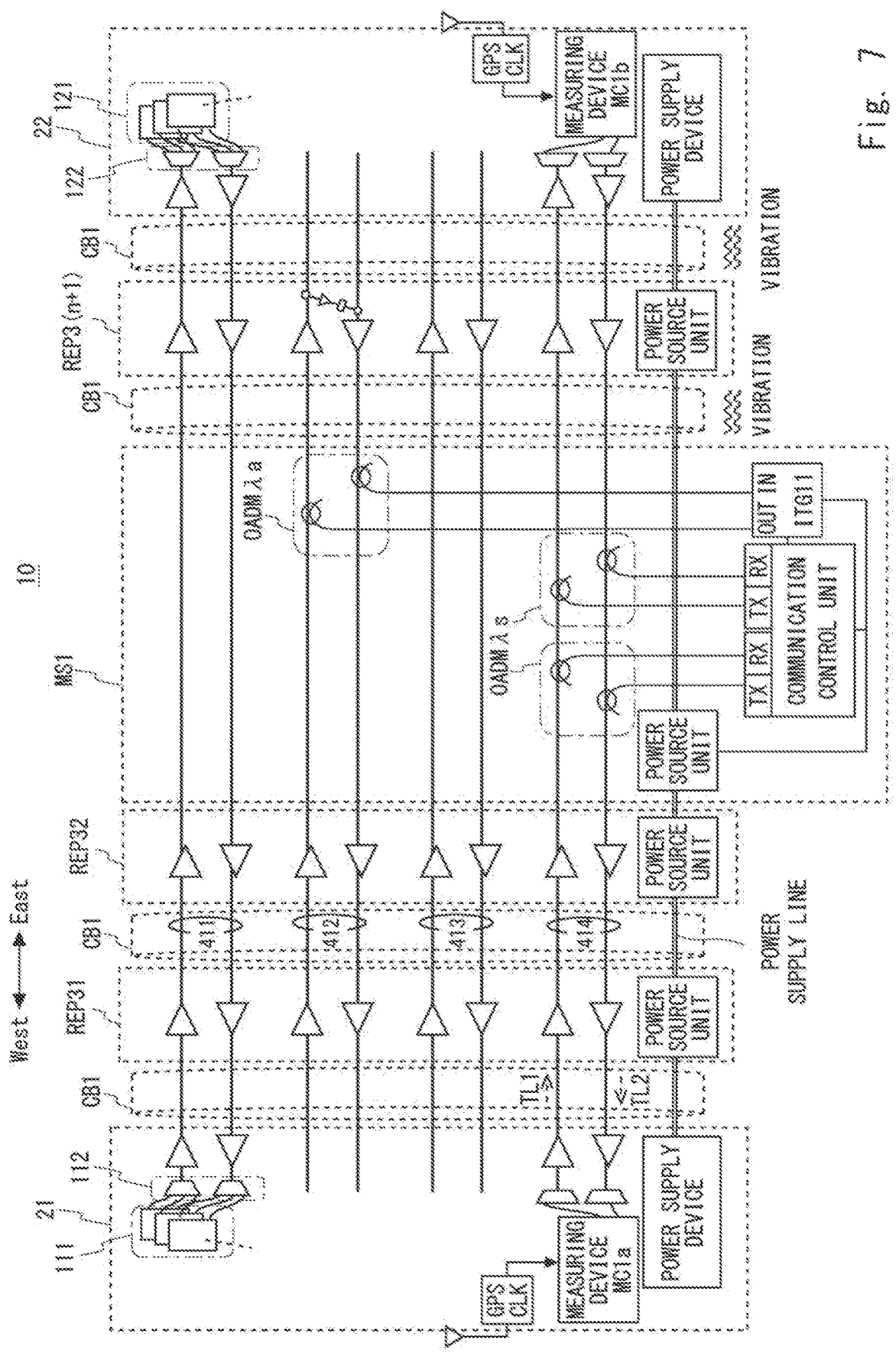
FIG. 7 is a configuration diagram illustrating a fourth configuration example of the measuring system according to the first example embodiment.

A fourth configuration example of the first example embodiment will be described by using FIG. 7. A difference from FIG. 3 is illustrated.

A means for achieving path redundancy and device redundancy by providing a plurality of the measuring devices MC1 for one measuring device MS1 is provided.

For example, in FIG. 3, a path used by the measuring device MS1 to communicate with the measuring device MC1 located at a terminal station is only between the terminal station 21 of the FP 414 and the measuring device MS1. A wavelength of λs between the terminal station 22 of the FP 414 and the measuring device MS1 is not used. Herein, as in FIG. 7, when a measuring device MC1b is also installed at the terminal station 22, and an optical signal including the same piece of environmental information or digital data before an analysis being acquired by performing AD conversion is transmitted from the measuring device MS1 to two measuring device MC1a and measuring device MC1b (the measuring device MC1a and the measuring device MC1b are also collectively referred to as the MC1), path redundancy and device redundancy can be achieved.

In order to form a plurality of the same optical transmission signals for communication in the measuring device MS1, branching by an optical coupler may be used, or a plurality of optical transmission/reception devices may be provided in the measuring device MS1 and distributed in a stage of an electric signal, and the same optical signal may be transmitted to different destinations. In the latter case, an effect of a redundant configuration for a failure of an optical transmitter/receiver is also achieved.

Data received by the plurality of measuring devices MC1 are further transmitted to a data center, and one device that normally receives data is selected, and data received by the other measuring device MC1 are discarded. When one measuring device MC1 that has been able to normally achieve reception cannot properly receive data, the device is automatically switched in such a way that reception data of the other measuring device MC1 are used. Contrivance to processing of preventing an interruption of data from occurring in a switching portion may also be made.

Further, communication of a control command and time information from the plurality of measuring devices MC1 to the measuring device MS1 has a mechanism for automatic selection and switching in such a way that any one piece is received on the measuring device MS1 side. The measuring device MC1 that can normally achieve reception may be selected.

A fourth effect of the first example embodiment described above will be described in several trouble occurring cases. In FIG. 7, the measuring device MS1 normally acquires time information from a time supply device of the terminal station 22 via the measuring device MC1b. Although the time information is also transmitted from the terminal station 21 to the measuring device MS1 via the measuring device MC1a, the measuring device MS1 discards the time information. The measuring device MS1 transmits measuring data to both of the measuring device MC1a and the measuring device MC1b.

Herein, when the time supply device of the terminal station 22 breaks down, the measuring device MS1 detects an abnormality in time information, and switches a source to the measuring device MC1a side. In this way, an operation of the measuring system is maintained.

Further, a case is considered where trouble occurs somewhere in a cable system closer to an East side than the measuring device MS1, or in the terminal station 22, but the measuring device MS1 or a few relay devices closer to the East side than the measuring device MS1 are operating, whereas communication between the measuring device MS1 and the measuring device MS1b fails. As described above, the time supply device is switched to the terminal station 21 side. In this case, measurement information on the East side is more important than usual, but the information is transmitted to the measuring device MC1a of the terminal station 21. In this way, an operation of the measuring system is maintained.

Second Example Embodiment

In the example embodiment described above, the measuring device MS1 installed remotely has a configuration including one interrogator, i.e., a configuration of performing sensing on an optical fiber cable in one path. In a second example embodiment, a cable system 100 for performing sensing on an optical fiber cable in a plurality of paths from one measuring device MS1 is provided.

Figure 8:
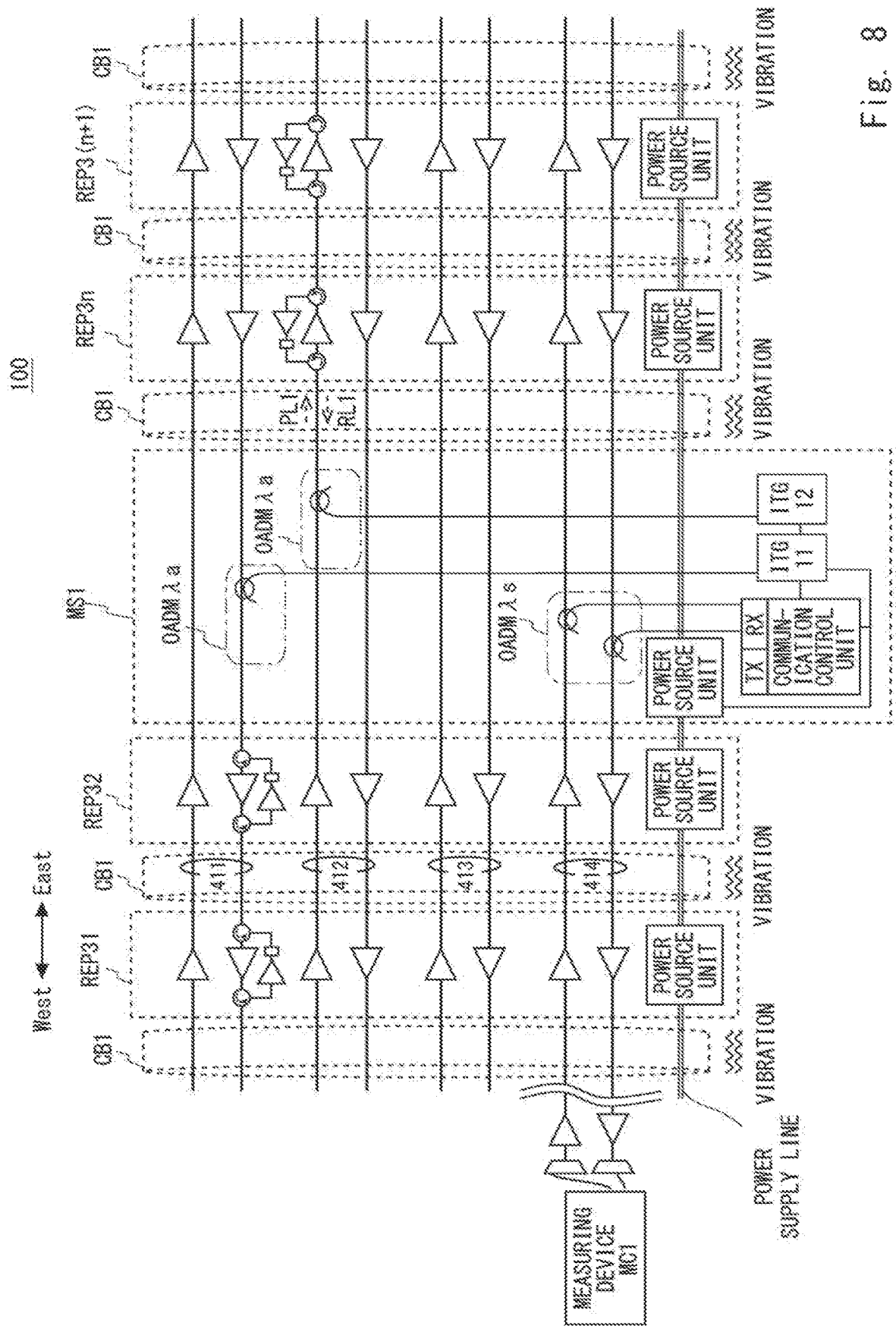
FIG. 8 is a configuration diagram illustrating a first configuration example of a measuring system according to a second example embodiment.

A first configuration example of the cable system 100 according to the second example embodiment will be described by using FIG. 8. The measuring device MS1 installed remotely includes two interrogators ITG11 and ITG12, and performs sensing on an optical fiber cable in two paths. In this example, the interrogator ITG11 performs sensing on a cable in a West direction, and the interrogator ITG12 performs sensing on a cable in an East direction. The configuration in FIG. 8 is acquired by adding one interrogator to the configuration in FIG. 3, and is also able to perform sensing on a cable on a West side, and the other portion is similar to that in FIG. 3. Both terminal stations 21 and 22 and a device included in the terminal stations 21 and 22 are omitted from the illustration in order to avoid complicatedness. In FIG. 8, an example of a single-core bidirectional optical amplifier is described as a relay device REP3n associated with sensing light.

Since the remote measuring device MS1 is normally provided on the way of a communication cable system, a connection point with a cable in a basic configuration of the device is located at two places as a standard. In other words, sensing of a cable in two paths is a standard configuration.

When a distance in which sensing can be achieved with a combination of the interrogator and the relay device is, for example, 500 km, one remote measuring device MS1 can cover a range within 500 km each from both of the East and West directions in total of 1000 km. When the remote measuring device MS1 is disposed every 1000 km, a range of a few 1000 km can also be covered. A limit of a distance in which the remote measuring device MS1 can be placed is determined by a limit of a communicable distance between a measuring device MC1 and the measuring device MS1. Since the present measuring system is contained in a communication system, sensing can be theoretically achieved in the entire communication system.

In the configuration example in FIG. 8, the interrogator ITG11 and the interrogator ITG12 are described as independent interrogators, but, when a plurality of interrogators are provided in the same device, some portions can be commonly used and a low cost can also be achieved. A representative portion is a sending portion of probe light. For example, a probe signal can be generated from one light source, be then branched by an optical coupler, and be sent to a different core wire.

Figure 9:
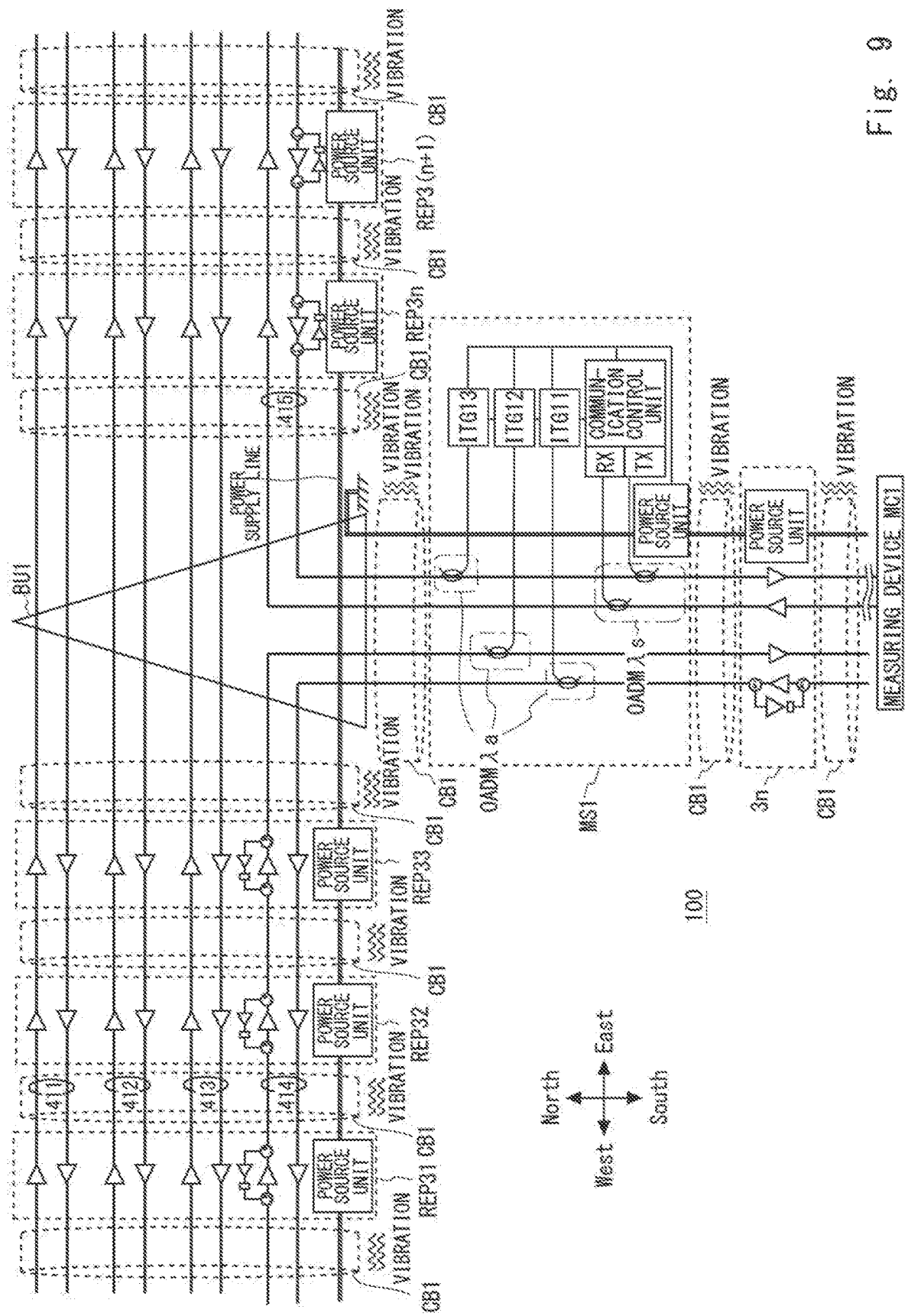
FIG. 9 is a configuration diagram illustrating a second configuration example of the measuring system according to the second example embodiment.

A second configuration example of the cable system 100 according to the second example embodiment will be described by using FIG. 9. A topology of the communication system has a configuration in which a trunk line is located in a West-East direction, a branching device BU1 (branching unit) is inserted on the way of the trunk line, and a branch line extends in a South direction.

The remote measuring device MS1 is disposed at a place adjacent to the branching device BU1 on the branching line, and the measuring device MC1 that communicates with the measuring device MS1 is installed at a terminal station at a South end, which is not illustrated.

The remote measuring device MS1 includes three interrogators ITG11, ITG12, and ITG13. The interrogator ITG11 performs sensing on a South-side cable, the interrogator ITG12 performs sensing on a West-side cable via the branching device BU1, and the interrogator ITG13 performs sensing on an East-side cable via the branching device BU1.

In this way, by using the branching device BU1 on the communication system side, sensing can be performed on paths more than two paths even without a branching function in the measuring device MS1 itself.

Figure 10:
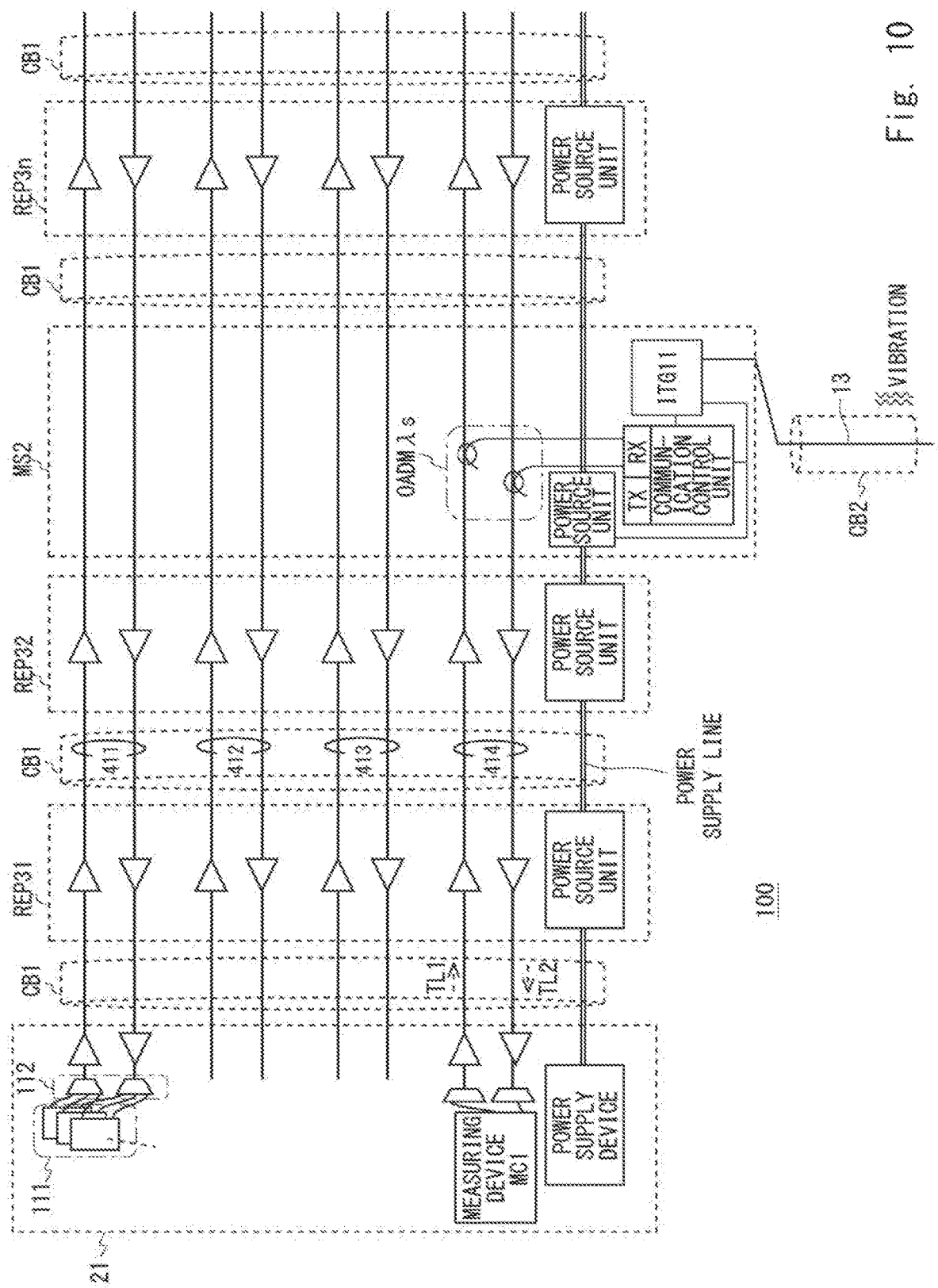
FIG. 10 is a configuration diagram illustrating a third configuration example of the measuring system according to the second example embodiment.

A third configuration example of the second example embodiment will be described by using FIG. 10. A remote measuring device MS2 has a branching function of an optical fiber cable. A cable CB2 is branched from a cable CB1 by the measuring device MS2. The branch line cable CB2 is a sensing-specific cable without having a communication function. The other configuration is similar to that in FIG. 3, and thus description will be omitted.

The cable CB2 may include a plurality of optical fiber core wires in addition to an optical fiber core wire 13. Further, the optical fiber core wire 13 may be extended by being relayed by a bidirectional optical amplification relay device that amplifies light in two directions.

The cable CB2 includes the optical fiber core wire 13. The optical fiber core wire 13 is connected to the interrogator ITG11.

Note that the measuring device MS2 may include the interrogators ITG12 and ITG13 similarly to the second configuration example. Then, the measuring device MS2 may perform sensing on the cable CB1.

An effect of the third configuration example of the second example embodiment will be described. By using the present configuration, the cable CB2 for sensing can be branched from the cable CB1 being a component of the communication system. Thus, sensing can be performed on a region different from a region along the cable CB1, i.e., a region along the cable CB2. A stable place in geographic terms is selected for a laid route of a communication cable. Meanwhile, an unstable place in geographic terms such as a place where an earthquake or a landslide is more likely to occur and a place where a high-temperature mineral spring is more likely to gush, for example, may be a region attracting a high degree of interest in sensing. A function of a cable can be divided by using the present configuration, and thus an effect is achieved in such a case.

Furthermore, optical sensing itself may not need an electric wire, that is, only an optical fiber may be laid. Although a device that requires power supply cannot be placed on the cable CB2, when a power supply function is excluded from the cable CB2, trouble due to an insulation fault does not occur, and the device can also be more easily disposed at a place with such a risk.

Note that the present invention is not limited to the example embodiments described above, and may be appropriately modified without departing from the scope of the present invention. For example, a measuring system, a measuring device, and a measuring method acquired by combining the configurations of the first and second example embodiments are also included within the scope of a technical idea of the first and second example embodiments.

A plurality of parallel measurements can be performed by setting different wavelengths in order to reduce a sampling time (pulse sending time interval) in an interrogator, and the present disclosed technique may be combined.

Although the invention of the present application has been described with reference to the example embodiments, the invention of the present application is not limited to the above-described example embodiments. Various modifications that can be understood by those skilled in the art can be made to the configuration and the details of the invention of the present application within the scope of the invention.

This application is based upon and claims the benefit of priority from Japanese patent application No. 2019-218774, filed on Dec. 3, 2019, the disclosure of which is incorporated herein in its entirety by reference.

REFERENCE SIGNS LIST 10, 100 Cable system
13 Optical fiber core wire
21, 22 Terminal station
111, 121 Transponder group
112, 122 Wavelength demultiplexer
BU1 Branching device
CB1 Cable
FP 411, FP 412, FP 413, FP 414 Optical fiber pair
ITG, ITG11, ITG12, ITG13 Interrogator
PL1 Probe light
REP31, REP32, REP33, REP3n, REP3(n+1) Amplification relay device
RL1 Backscattered light
TL1, TL2 Inter-measuring device communication optical signal
MC1, MC1a, MC1b, MS1 Measuring device

What is claimed is:

1. An optical fiber sensing system comprising:
an interrogator configured to perform an optical fiber sensing function added to a long-range optical communication cable system including an optical amplification relay device by sending probe light to an optical fiber, detecting backscattered light of the probe light, and performing sensing on environmental information around the optical fiber;
a first sensing device installed at a remote place different from a terminal station of the optical communication cable system; and
a second sensing device installed at the terminal station, and configured to communicate with the first sensing device,
wherein the first sensing device comprises:
the interrogator;
a power source unit configured to receive power via the optical communication cable system and supply power to the first sensing device; and
a communication unit configured to communicate with the second sensing device,
wherein the interrogator is configured to generate sensing data at each point on the optical fiber by performing sensing on environmental information around the optical fiber, which is connected to the first sensing device,
wherein the communication unit is configured to transmit the sensing data to the second sensing device,
wherein the first sensing device comprises a housing separated from a plurality of optical amplification relay devices connected to the optical communication cable system via a cable, and
wherein the first sensing device is connected to the cable,
wherein a communication service wavelength of the optical communication cable system, a wavelength at which the first sensing device and the second sensing device communicate with each other, and a wavelength of the probe light and the backscattered light are different from one another, and
wherein the first sensing device is configured such that:
the probe light and the backscattered light are wavelength multiplexed and demultiplexed and propagate in a predetermined direction in the predetermined optical fiber in the cable;
light for communicating with the second sensing device is wavelength multiplexed and demultiplexed and propagates in a predetermined direction in a predetermined optical fiber in the cable; and
through-connection is made on an optical fiber other than an optical fiber through which the probe light, the backscattered light, and light for communicating with the second sensing device propagate, among a plurality of optical fibers in the cable.

2. The optical fiber sensing system according to claim 1, wherein the second sensing device is configured to acquire time information, and transmit the time information to the first sensing device,
wherein the first sensing device is configured to put the sensing data and the time information together, and transmit the information to the second sensing device, and
wherein at least one of the first sensing device and the second sensing device is configured to automatically detect a propagation delay time of the cable, and correct the time information.

3. The optical fiber sensing system according to claim 1, wherein the interrogator is configured to transmit, to the second sensing device, data before analysis is acquired by performing AD conversion on an electric signal acquired by detecting the backscattered light including the environmental information, and
wherein the second sensing device comprises an analysis processing unit configured to analyze data about the backscattered light which is subjected to AD conversion, and acquire sensing data at each point on the optical fiber cable.

4. The optical fiber sensing system according to claim 1, further comprising a plurality of the second sensing devices at a plurality of terminal stations of the optical communication cable system,
wherein the first sensing device is configured to add a redundant function by transmitting a same piece of the environmental information to the plurality of second sensing devices.

5. The optical fiber sensing system according to claim 1, wherein the first sensing device comprises a plurality of the interrogators, and
wherein the probe light and the backscattered light are wavelength multiplexed and demultiplexed in a predetermined direction of a plurality of predetermined optical fiber core wires.

6. The optical fiber sensing system according to claim 5, wherein an optical fiber subjected to sensing performed by the plurality of interrogators in the first sensing device is configured to communicate with a cable in a different path through a cable branching device included in the optical communication cable system.

7. The optical fiber sensing system according to claim 1, wherein the first sensing device also has a cable branching function from a sensing cable in a path different from the optical communication cable system, and
wherein the optical fiber sensing system is configured to perform sensing on environmental information around an optical fiber included in the sensing cable, and to transmit the environmental information to the second sensing device.

8. A measuring device comprising:
an interrogator configured to perform an optical fiber sensing function added to a long-range optical communication cable system including an optical amplification relay device by sending probe light to an optical fiber, detecting backscattered light of the probe light, and performing sensing on environmental information around the optical fiber;
a first sensing device installed at a remote place different from a terminal station of the optical communication cable system; and
a second sensing device installed at the terminal station, and configured to communicate with the first sensing device,
wherein the first sensing device comprises:
the interrogator;
a power source unit configured to receive power via the optical communication cable system and supply power to the first sensing device; and
a communication unit configured to communicate with the second sensing device,
wherein the interrogator is configured to generate sensing data at each point on the optical fiber by performing sensing on environmental information around the optical fiber, which is connected to the first sensing device,
wherein the communication unit is configured to transmit the sensing data to the second sensing device,
wherein the first sensing device comprises a housing separated from a plurality of optical amplification relay devices connected to the optical communication cable system via a cable,
wherein the first sensing device is connected to the cable,
wherein a communication service wavelength of the optical communication cable system, a wavelength at which the first sensing device and the second sensing device communicate with each other, and a wavelength of the probe light and the backscattered light are different from one another, and
wherein the first sensing device is configured such that:
the probe light and the backscattered light are wavelength multiplexed and demultiplexed and propagate in a predetermined direction in the predetermined optical fiber in the cable,
light for communicating with the second sensing device is wavelength multiplexed and demultiplexed and propagates in a predetermined direction in a predetermined optical fiber in the cable, and
through-connection is made on an optical fiber other than an optical fiber through which the probe light, the backscattered light, and light for communicating with the second sensing device propagate, among a plurality of optical fibers in the cable.

9. The measuring device according to claim 8, wherein the second sensing device is configured to acquire time information, and transmit the time information to the first sensing device,
wherein the first sensing device is configured to put the sensing data and the time information together, and transmit the information to the second sensing device, and
wherein at least one of the first sensing device and the second sensing device is configured to automatically detect a propagation delay time of the cable, and correct the time information.

10. The measuring device according to claim 8, wherein the interrogator is configured to transmit, to the second sensing device, data before analysis is acquired by performing AD conversion on an electric signal acquired by detecting the backscattered light including the environmental information, and
wherein the second sensing device comprises an analysis processing unit configured to analyze data about the backscattered light which is subjected to AD conversion, and acquire sensing data at each point on the optical fiber cable.

11. The measuring device according to claim 8, further comprising a plurality of the second sensing devices at a plurality of terminal stations of the optical communication cable system,
wherein the first sensing device is configured to add a redundant function by transmitting a same piece of the environmental information to the plurality of second sensing devices.

12. The measuring device according to claim 8, wherein the first sensing device comprises a plurality of the interrogators, and
wherein the probe light and the backscattered light are wavelength multiplexed and demultiplexed in a predetermined direction of a plurality of predetermined optical fiber core wires.

13. The measuring device according to claim 12, wherein an optical fiber subjected to sensing performed by the plurality of interrogators in the first sensing device is configured to communicate with a cable in a different path through a cable branching device included in the optical communication cable system.

14. The measuring device according to claim 8, wherein the first sensing device also has a cable branching function from a sensing cable in a path different from the optical communication cable system, and
wherein the measuring device is configured to perform sensing on environmental information around an optical fiber included in the sensing cable, and to transmit the environmental information to the second sensing device.

15. A measuring method in to optical communication cable system comprising:
by a first sensing device, which is installed at a remote place different from a terminal station of an optical fiber sensing system acquired by adding an optical fiber sensing function to a long-range optical communication cable system including an optical amplification relay device, receiving power via the optical communication cable system;
supplying power to the first sensing device;
by an interrogator installed in the first sensing device, performing operations comprising:
generating sensing data at each point on an optical fiber, which is connected to the first sensing device by sending probe light to the optical fiber;
detecting backscattered light of the probe light; and
performing sensing on environmental information around the optical fiber;
transmitting the sensing data to a second sensing device installed at the terminal station;
separating a housing of the first sensing device from a plurality of optical amplification relay devices connected to the optical communication cable system via a cable;
connecting the first sensing device to the cable;
setting a communication service wavelength of the optical communication cable system, a wavelength at which the first sensing device and the second sensing device communicate with each other, and a wavelength of the probe light and the backscattered light to be different from one another; and
by the first sensing device, performing operations comprising:

wavelength multiplexing and demultiplexing the probe light and the backscattered light and propagating the probe light and the backscattered light in a predetermined direction in the predetermined optical fiber in the cable;

wavelength multiplexing and demultiplexing light for communicating with the second sensing device and propagating the light in a predetermined direction in a predetermined optical fiber in the cable; and making through-connection on an optical fiber other than an optical fiber through which the probe light, the backscattered light, and light for communicating with the second sensing device propagate, among a plurality of optical fibers in the cable.

16. The measuring method according to claim 15, further comprising:

causing the second sensing device to acquire time information, and transmit the time information to the first sensing device;

causing the first sensing device to pit the sensing data and the time information together, and transmit the information to the second sensing device; and causing at least one of the first sensing device and the second sensing device to automatically detect a propagation delay time of the cable, and correct the time information.

17. The measuring method according to claim 15, further comprising:

by the interrogator, transmitting, to the second sensing device, data before analysis is acquired by performing AD conversion on an electric signal acquired by detecting backscattered light including the environmental information; and causing the second sensing device to include an analysis processing unit configured to analyze data about the backscattered light being subjected to AD conversion, and acquire sensing data at each point on the optical fiber cable.

* * * * *